United States Patent Office 3,073,945
Patented Jan. 15, 1963

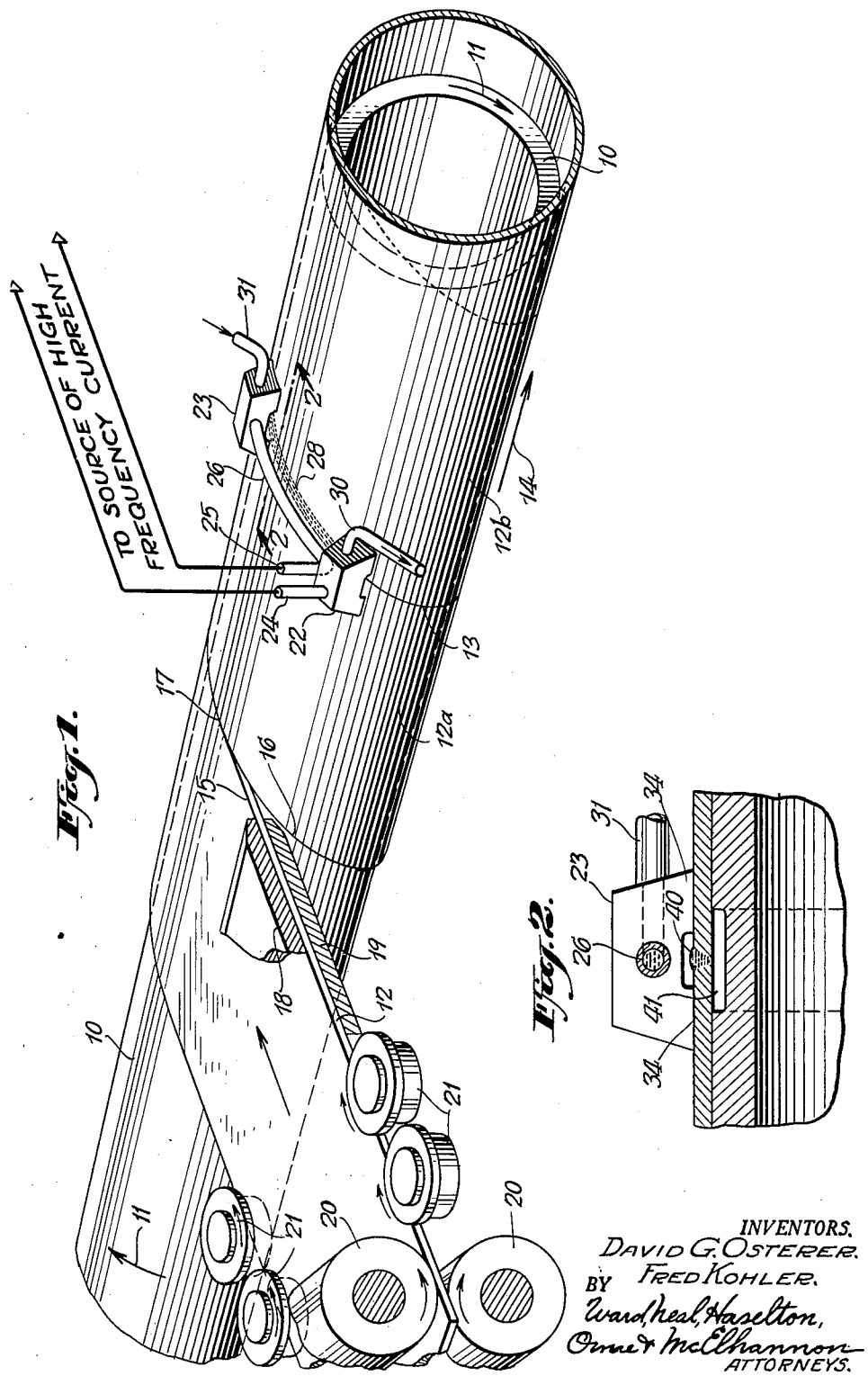

3,073,945
METHOD FOR MANUFACTURING HELICALLY WELDED TUBING
David G. Osterer, Harrison, and Fred Kohler, New York, N.Y., assignors, by mesne assignments, to American Machine & Foundry Company, New York, N.Y., a corporation of New Jersey
Filed Mar. 3, 1961, Ser. No. 93,065
2 Claims. (Cl. 219—67)

This invention relates to methods for welding metal tubing of types formed by helically winding a metal ribbon while welding together adjacent edges of the ribbon along a helical line.

Reference is made to U.S. patent to Wallace C. Rudd No. 2,873,353, granted February 10, 1959, wherein methods and apparatus are disclosed for the above purposes and which have gone into extensive and successful use both for forming a helical welded seam of the butt welded type as well as of the lap or mash-lapped welded types. However, under certain circumstances, depending upon the dimensions of the metal stock used and the desired dimensions of the resulting tubing, when making a butt welded seam with the methods of the patent, it is difficult accurately and uniformly to control the gap at the apex of which the weld point occurs and to apply uniform pressure between the gap edges to secure a uniform weld. Also, when the methods of that patent are used for forming a lap weld under certain circumstances, difficulties may sometimes occur due to the occurrence of abnormally cool spots on the engaging surfaces of the metal thereby giving rise to imperfect welds when the metal stock is of dimensions difficult to mechanically control. The methods of that patent are particularly desirable for producing a good weld of the so-called "forged weld type" wherein only the very surfaces of the metal at the weld line become fused at the weld point and the metal at depths in back of such surfaces remain firm thereby permitting the surfaces to be firmly pressed together and to form the weld without any substantial amount of fused metal therein. While in many cases this is highly desirable to provide a strong weld with a minimum of disturbance of the crystalline structure of the metal at the weld line, yet this may result in some upsetting of the metal along the weld line either internally or externally of the tubing, or both, thereby requiring the upset metal to be scarfed away. If the interior of the tubing is to be smooth walled, any metal upset therein, of course, would have to be scarfed away but that step often involves some difficulties on the interior of the tubing.

The present invention provides a highly satisfactory method and means for avoiding the above noted difficulties. In accordance with the present method, the metal ribbon or strip is wound helically as disclosed in the above-mentioned patent, but instead of heating its edges at a gap where the forward and trailing edges of the metal ribbon are brought together, the strip or ribbon is first wound into place preferably to form at least one full turn or a substantial portion of a convolution and means are provided for heating such edges to welding temperature by the application of high frequency heating current thereto after the edges have come into contact. Furthermore, the application of the high frequency heating current is such as preferably to cause a form of cast weld to occur at which there will be no troublesome upset of the metal either internally or externally of the finished tubing.

In the method of the patent above referred to, the high frequency current is conductively applied to heat the edges of a gap in advance of the weld point and the current flowing at any one moment in opposite directions on opposite sides so that the current is caused to be very effectively concentrated on the very surfaces which are to be welded together, thus making possible the above-mentioned forged type of weld. On the contrary, with the present invention, the current is applied along the trailing and forward edges of the metal ribbon after such edges have come into contact and the current so applied that it will flow in the same direction on both edges but will be concentrated thereon only to a degree such that some fusion of the metal will occur at least in the outermost portions of the metal to a substantial depth and at each side of the desired weld line, so that a "cast" type of weld will result. In a cross-section in this cast type of weld, the metal will become so fused and cast that the cross-section thereof will be generally triangular or wider toward the outside of the metal tubing and narrowing almost to a point at the inside, with the result that no substantial upsetting of the metal internally will occur and if there is some substantial tendency of the metal to upset, it will tend to do so outwardly where a wider mass of the metal became substantially fused.

Various further and more specific objects, features and advantages of the invention will appear from the description given below taken in connection with the accompanying drawings illustrating, by way of example, a certain preferred form of the invention.

In the drawings:

FIG. 1 is a somewhat schematic perspective view of a preferred arrangement of the apparatus and parts for carrying out the present invention; and FIG. 2 is an enlarged fragmentary sectional view taken substantially along line 2—2 of FIG. 1.

Referring now to FIG. 1 in further detail, a mandrel is provided as at 10 which may be rotatably supported by suitable means such as referred to in the above-mentioned patent or otherwise, and arranged to be rotated about its axis at a constant speed in the direction indicated by the arrows 11, also by suitable means such as referred to in the said patent or otherwise. Meanwhile, a strip or ribbon of metal 12 is wound onto the mandrel to form a tube thereon made up of a succession of convolutions as at 12a, 12b of the metal ribbon, the edges of which convolutions are brought into abutting relationship along a helical path as indicated at 13. As the mandrel with the formed tube thereon rotates, the tubing as formed is also advanced in the general direction indicated by the arrow 14 and by the use of suitable known types of apparatus which per se form no part of the present invention. It will also be understood that the helical convolutions of the ribbon may be formed in various ways known in the art of tube welding other than by winding same about a mandrel or about a rotating mandrel.

As shown, the forward edge, as at 15, of the metal ribbon comes tangentially into engagement with the trailing edge 16 of one of the wound convolutions at a point indicated at 17. Suitable guide means, if desired, as at 18 and 19 may be mounted to engage the ribbon surfaces as it is advanced into position for winding and also suitable rollers, as at 20 and 21, may be mounted to engage the upper and lower surfaces and the edges respectively of the ribbon for guiding same and, if desired, for feeding same forwardly in case one or more pairs of such rollers are desired to be suitably driven.

At some point subsequent to the point 17 where the ribbon edges first engage and preferably following the formation of one full convolution or a substantial fraction of a convolution, contacts 22, 23 are mounted on suitable supporting means (not shown) for engaging and applying current from a high frequency source as indicated to two spaced apart regions along the line of the desired welded seam. These contacts are respectively connected to terminals of a source of current of a frequency of at least about 50,000 cycles and preferably higher, such as 350,000 to 400,000 per second or higher.

As shown, one terminal of the current source is connected as at 24 to contact 22 and the other terminal of the source is connected as at 25 to a conductor member 26 which extends along in closely spaced relation to the desired line of welding and thence to the contact 23. This will provide a circuit extending from one terminal of the source through connection 24, contact 22, thence along as at 28 on the edges of the metal which are to be heated to welding temperature, thence to contact 23 and back on conductor member 26 to the other terminal 25 of the source. The current is closely concentrated along on the metal surfaces at 28 which are to be heated, this being caused by the so-called proximity effect arising from the mutual inductance as between adjacent current paths on conductor member 26 and on the tube metal.

The contacts, as well as the connections thereto, are preferably fluid cooled in accordance with the usual practice with parts carrying such high frequency currents, the cooling fluid, if desired, passing through tubular portions such as at 24, 25 and 26 which form parts of the circuit and suitable cavities being provided in the contacts 22, 23 for conveying the fluid to suitable connecting conduits as indicated at 30, 31.

As shown in the drawings, the contacts 22, 23 may preferably be so shaped that each will have two surfaces as at 33, 34 (see FIG. 2) for engaging respectively the forward and trailing body edges of the metal ribbon. That is, these contacts, as shown, are so shaped as to be positioned to straddle or to be astride the weld line and so that they will not interfere with or scrape against the metal which becomes more or less fused along a band at the weld line. Due to the proximity effect of the conductor portion 26, the current flowing between the two contacts 22 and 23 on either side of the weld line will tend to be closely concentrated along such line with the result that the metal will be substantially fused at or shortly before it reaches the contact 23 and the cross-section of such heated metal will be generally of the triangular shape as indicated at 40, FIG. 2. To a considerable degree because of the presence of the conductor portion 26, the current will tend to be concentrated more on the outer surface of the metal and thus, as indicated at 40, the portions thereof which become heated to welding temperature for forming a cast weld will be wider near the outer surfaces and generally quite narrow on the inner surfaces of the tubing. Thus there will be no substantial tendency for the metal to become upset inwardly and such upsetting, if same occurs to any substantial degree, will tend to be in an upward direction in view of the V-shaped cross-section of the heated mass of metal. If desired, the mandrel, if one is used, may be cut away as indicated at 41 with a circumferential groove at the regions where the welding occurs.

The invention is adapted for forming tubing of both ferrous and non-ferrous metals and, if desired, means may be provided for subjecting the region of the welding to an atmosphere of argon, carbon dioxide or other inert gas to prevent oxidation of the heated metal along the weld line. The invention makes possible the manufacture of helically wound metal tubing at unusually rapid rates of speed, for example, with the formation of a weld line of a length from 20 to 100 feet per minute, and by using ribbon stock having a thickness, for example, of ⅛ inch or greater, and with the finished tubing substantially free of upset metal.

Although a particular embodiment of the invention is herein disclosed for purposes of explanation, various modifications thereof, after study of this specification, will be apparent to those skilled in the art to which the invention pertains. Reference should accordingly be had to the appended claims in determining the scope of the invention.

What is claimed and desired to be secured by Letters Patent is:

1. In a method for forming metal tubing by helically winding a metal ribbon to form successive convolutions joined together at their edges by a helically extending seam in the form of a cast weld, the combination of steps which comprises: advancing the ribbon generally flatwise and tangentially of a convolution of the desired tubing with the edges of the ribbon positioned at an angle to the axis of the tubing being formed, such angle corresponding to the pitch of the desired helically welded seam; forming the ribbon into a succession of convolutions with abutting edges, heating said edges along a length thereof subsequent to the point where same are brought together, by applying contacts thereto at spaced apart successive points thereon, said contacts respectively being connected to the terminals of a source of current of a frequency of about 50,000 cycles per second or higher, whereby said current flows from one of said terminals to one of said contacts, thence along on said edges to the other of said contacts and thence to the other terminal of said source, and providing means extending along close to the meeting line of said edges for inductively causing such current to be concentrated along close to said line and more toward the outer surface of the tubing than at the inner surface, the current being sufficient to act substantially to fuse a mass of the tube metal having a cross-sectional shape at the seam substantially wider at the exterior than at the interior surface of the tubing, such mass being allowed to become cast in such shape to form said cast weld without substantial internal upset of the metal.

2. In a method for forming metal tubing by helically winding a metal ribbon to form successive convolutions joined together at their edges by a helically extending seam in the form of a cast weld, the combination of steps which comprises: advancing the ribbon generally flatwise and tangentially of a convolution of the desired tubing with the edges of the ribbon positioned at an angle to the axis of the tubing being formed, such angle corresponding to the pitch of the desired helically welded seam; forming the ribbon into a succession of convolutions with abutting edges, heating said edges along a length thereof subsequent to the point where same are brought together by applying contacts thereto at spaced apart successive points thereon, providing a conductor extending along close to the meeting line of said edges, said contacts being connected to a source of current of a frequency of the order of 100,000 cycles per second or higher, and whereby said current flows from one of the terminals of said source to one of said contacts, thence along on said edges to the other of said contacts, thence along on said conductor and to the other terminal of said source, the current on said conductor inductively causing the current on said edges to be concentrated along close to said line and more toward the outer surface of the tubing than at the inner surface, the current being sufficient to act substantially to fuse a mass of the tube metal having a generally triangular cross-sectional shape at the seam with the apex of such cross-section located at the interior surface of the tubing, such mass being allowed to become cast in such shape for forming said cast weld.

References Cited in the file of this patent

UNITED STATES PATENTS

| | | |
|---|---|---|
| 2,857,503 | Rudd et al. | Oct. 21, 1958 |
| 2,873,353 | Rudd | Oct. 10, 1959 |